United States Patent
Kim et al.

(10) Patent No.: US 9,703,424 B2
(45) Date of Patent: Jul. 11, 2017

(54) ELECTRODE PATTERN OF TOUCH PANEL AND FORMING METHOD FOR THE SAME

(71) Applicant: LG INNOTEK CO., LTD., Seoul (KR)

(72) Inventors: Byung Soo Kim, Seoul (KR); Hyuk Jin Hong, Seoul (KR); Chan Kyu Koo, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 435 days.

(21) Appl. No.: 13/711,210

(22) Filed: Dec. 11, 2012

(65) Prior Publication Data

US 2013/0155011 A1 Jun. 20, 2013

(30) Foreign Application Priority Data

Dec. 16, 2011 (KR) .................. 10-2011-0135986

(51) Int. Cl.
*G06F 3/044* (2006.01)
*B82Y 15/00* (2011.01)

(52) U.S. Cl.
CPC .............. *G06F 3/044* (2013.01); *B82Y 15/00* (2013.01); *G06F 2203/04103* (2013.01); *G06F 2203/04111* (2013.01)

(58) Field of Classification Search
CPC ..................................... G06F 3/044
See application file for complete search history.

(56) References Cited

U.S. PATENT DOCUMENTS

| | | | |
|---|---|---|---|
| 6,970,160 B2 | 11/2005 | Mulligan et al. | |
| 2008/0062147 A1* | 3/2008 | Hotelling et al. | 345/174 |
| 2009/0309850 A1* | 12/2009 | Yang | G06F 3/044 |
| | | | 345/174 |
| 2012/0169647 A1* | 7/2012 | Kuo | G06F 3/044 |
| | | | 345/174 |

FOREIGN PATENT DOCUMENTS

| | | |
|---|---|---|
| CN | 102087566 A | 6/2011 |
| CN | 102253781 A | 11/2011 |
| JP | 2000-138512 A | 5/2000 |
| JP | 2009-053894 A | 3/2009 |

(Continued)

OTHER PUBLICATIONS

Office Action dated Sep. 7, 2015 in Taiwanese Application No. 101145015.

(Continued)

*Primary Examiner* — Kent Chang
*Assistant Examiner* — Sepideh Ghafari
(74) *Attorney, Agent, or Firm* — Saliwanchik, Lloyd & Eisenschenk

(57) ABSTRACT

The present invention relates to an electrode pattern of a touch panel and a forming method of the electrode pattern of a touch panel. The electrode pattern of a touch panel according to the present invention includes a plurality of electrode pattern cells which are arranged on a substrate in a space, a dielectric layer formed on the electrode pattern cell, and a bridge electrode which is formed on the dielectric layer by using conductive material of black color and connects the electrode pattern cells.

10 Claims, 6 Drawing Sheets

(56) References Cited

FOREIGN PATENT DOCUMENTS

| JP | 2011-034183 A | 2/2011 |
| JP | 2011-040028 A | 2/2011 |
| JP | 2011-090443 A | 5/2011 |
| JP | 2013-516024 A | 5/2013 |
| KR | 10-2011-0118411 A | 10/2011 |
| KR | 10-2011-0126528 A | 11/2011 |
| TW | 200919287 A | 5/2009 |
| TW | 201013500 A | 4/2010 |
| TW | M378433 U | 4/2010 |

OTHER PUBLICATIONS

Office Action dated May 12, 2015 in Chinese Application No. 201210540108.0, filed Dec. 13, 2012.

\* cited by examiner

ELECTRODE PATTERN OF TOUCH PANEL AND FORMING METHOD FOR THE SAME

CROSS-REFERENCE TO RELATED APPLICATION

This application claims the benefit under 35 U.S.C. §119 of Korean Patent Application No. 10-2011-0135986, filed Dec. 16, 2011, which is hereby incorporated by reference in its entirety.

BACKGROUND

Field of the Invention

The present invention relates to an electrode pattern of a touch panel and a forming method for the electrode pattern. More particularly, it relates to an electrode pattern of a touch panel and a forming method of the electrode pattern of a touch panel in which a bridge electrode for connecting the electrode patterns is formed.

Description of the Related Art

Generally, in a personal digital assistant (PDA), a notebook computer, an office automatic device, a medical instrument, or a car navigation system and the like a touch panel has been used for providing input means (pointing device) with the displays of the above-mentioned devices. A capacitive type has been used as a typical touch panel, in addition to a resistance film type, an electromagnetic induction type, and an optical type and the like.

Here, the capacitive type is classified as an analog way and a digital way. The pattern of a conductive for a sensor formed as a sheet shape is not necessary within a sensing region in the analogy way. On the contrary the patter of a conductive for a sensor is necessary within a sensing region. In the digital way, a capacitive touch panel may adopt the capacitance variation induced between human body's electrostatics and a transparent conductive for inducing based current to confirm a touch position. For detecting the position touched to the touch panel by a finger or stylus, various capacitive touch panel technologies have been developed.

In U.S. Pat. No. 6,970,160, a lattice touch-sensing system for detecting the touch position on a touch-sensitive surface has been disclosed as one example of the capacitive panel. The lattice touch-sensing system includes two capacitive sensing layers separated through dielectric materials, and each capacitive sensing layer is made of conducting elements arranged in a parallel wherein the conducting elements in the two sensing layers are arranged perpendicularly. In addition, the conducting elements each may be made of a series of patches in a diamond shape connected to each other through narrow conductive rectangular strips. The respective conducting element in a given sensing layer is electrically connected to a lead line of the lead line set, corresponding to one end or both ends thereof. Additionally, a control circuit may be included for providing an exciting signal to both sets of the conducting elements through the corresponding lead line set, receiving a sensing signal produced from the sensor elements when a surface is touched, and determining the touched position, based on the position of the affected bars in the respective layer.

The capacitive type may include two capacitive sensing layers which are formed in a space to each other by using dielectric material for inducing capacitive effect between the two layers. This configuration causes the touch panel to be very thick and thus is counter-thinned thereof. Furthermore, a conventional capacitive touch panel includes a substrate on both surfaces thereof on which two capacitive sensing layers are formed. In this point, a through hole is formed on the substrate to serve as a bias and further a circuit layering is adopted for connecting properly the conductor elements on the sensing layers, which causes the manufacturing of the capacitive panel to be difficult and complicated.

Accordingly, in order to solve the above-mentioned drawbacks, a technology for reducing the two capacitive sensing layers to one layer has been proposed.

FIG. 1 is a view illustrating an electrode pattern of a touch panel according to a prior art, and FIG. 2 is a cross-sectional view illustrating an electrode pattern of a touch panel according to a prior art. Hereinafter, a conventional touch panel and an electrode pattern according to a prior art will be described, referring to FIGS. 1 and 2.

As shown in FIGS. 1 and 2 (*a*), a first axis Rx electrode pattern 120 is formed on a substrate 110 and a second axis Tx electrode transparent pattern cell 131 are formed wherein the electrode patterns are shown in a section thereof in FIG. 2.

At this time, the first axis electrode pattern 120 and the second axis electrode transparent pattern 131 may be formed by using etching, sputtering, or screen printing and further the transparent pattern may be made of Indium-Tin Oxide (ITO).

After that, as shown in FIG. 2(*b*), a photo resist layer 10 is formed on the second electrode pattern cell 131 and then a dielectric material application layer 40 is formed by applying the dielectric material.

In subsequent, a dielectric layer 50 is formed by removing the photo resist layer 10, as shown in FIG. 2(*c*). Here, a bridge electrode 90 is formed on the dielectric layer 50 to connect electrically the second axis Tx electrode pattern cells 131 which are spaced.

However, since the bridge electrode of the electrode pattern of a conventional touch panel for connecting the electrode pattern cells 131 is exposed visibly, and thus a width of the bridge electrode is 10 μm and as a result metal is used for the bridge electrode in consideration of electric conductivity. However, the bridge electrode is exposed visibly due to different reflection rate and colors between the metal and surrounding LCD.

Further, in case where transparent ITO electrode in order to solve the visible exposure, a design of decreasing a conductive width is impossible due to a limitation of the electric conductivity for the transparent electrode and further an additional process for etching selectively the ITO and the metal is necessary.

BRIEF SUMMARY

The present invention has been proposed for solving the above mentioned-drawbacks and an object of the present invention relates to provide an electrode pattern of a touch panel and a forming method of the electrode pattern of a touch panel in which the electric conductivity of a bridge electrode is ensured and the bridge electrode is not exposed visibly while forming the electrode patterns Rx, Tx on one film.

A forming method of an electrode pattern of a touch panel according to an embodiment of the present invention includes steps of forming a plurality of electrode pattern cells formed to each other in a space on a substrate, forming a dielectric layer on the electrode pattern cell, and forming a bridge electrode which is formed on the dielectric layer by using conductive material of black color and connects the electrode pattern cells.

A electrode pattern of a touch panel according to another embodiment of the present invention includes a plurality of electrode pattern cells formed to each other in a space on a substrate, a dielectric layer on the electrode pattern cell, and a bridge electrode which is formed on the dielectric layer by using conductive material of black color and connects the electrode pattern cells.

BRIEF DESCRIPTION OF THE DRAWINGS

The above and other aspects, features and advantages of certain exemplary embodiments of the present invention will be more apparent from the following description taken in conjunction with the accompanying drawings, in which.

DETAILED DESCRIPTION

Figure 1:
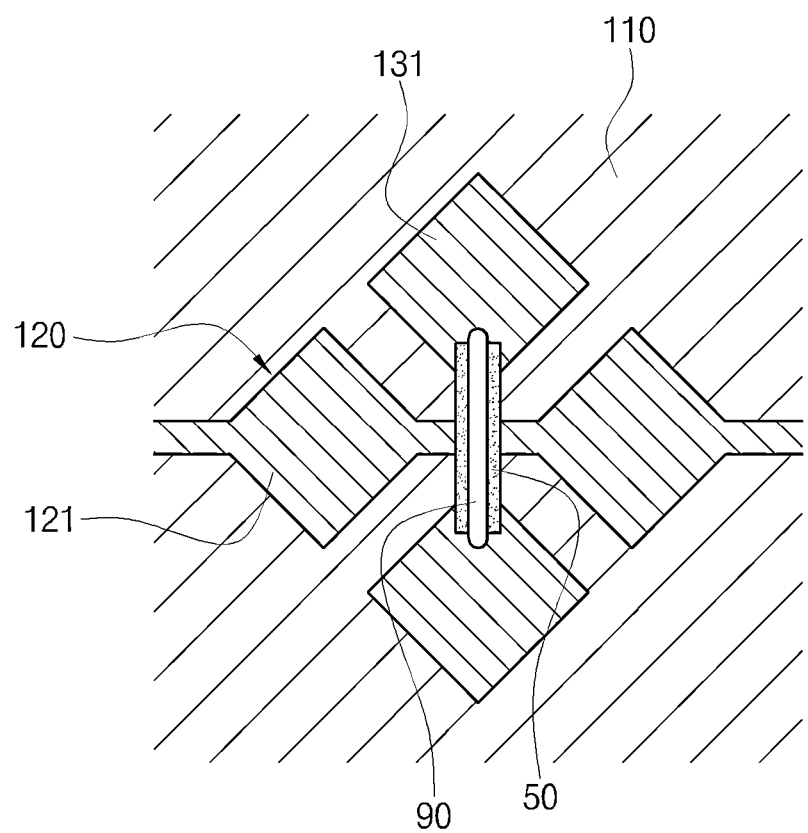
FIG. 1 is a view illustrating an electrode pattern of a touch panel according to a prior art.
Figure 2:
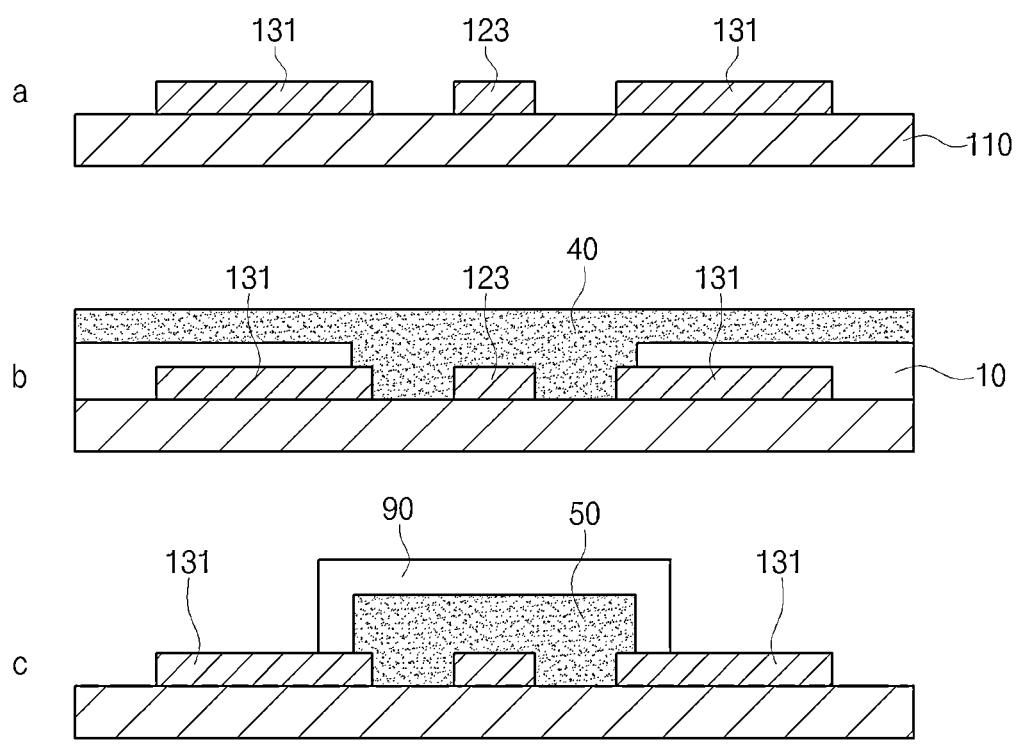
FIGS. 2 (a), (b), and (c) are views illustrating cross-sections of the electrode pattern of a touch panel according to a prior art, respectively.

Exemplary embodiments of the present invention will be described below in detail with reference to the accompanying drawings. Wherever possible, the same reference numerals will be used to refer to the same elements throughout the specification, and a duplicated description thereof will be omitted.

Referring to FIGS. 3 to 6, the electrode pattern of a touch panel according to an embodiment of the present invention will be described.

Figure 3:
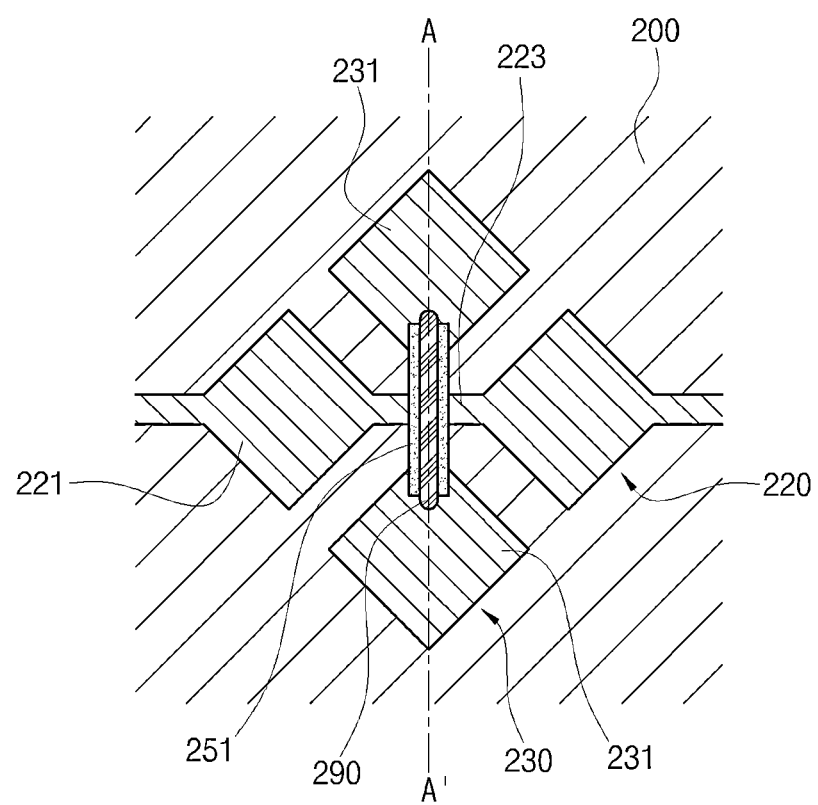
FIGS. 3 and 4 are views illustrating an electrode pattern of a touch panel according to the present invention, respectively.
Figure 4:
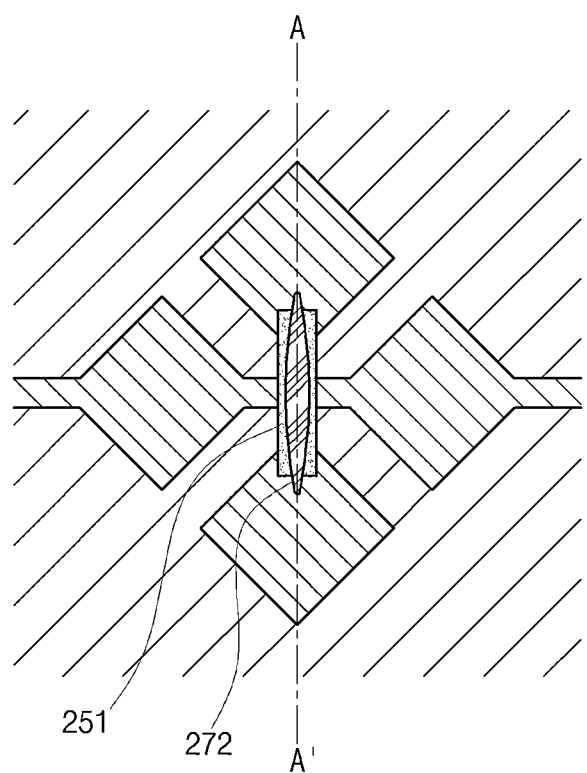
Figure 5:
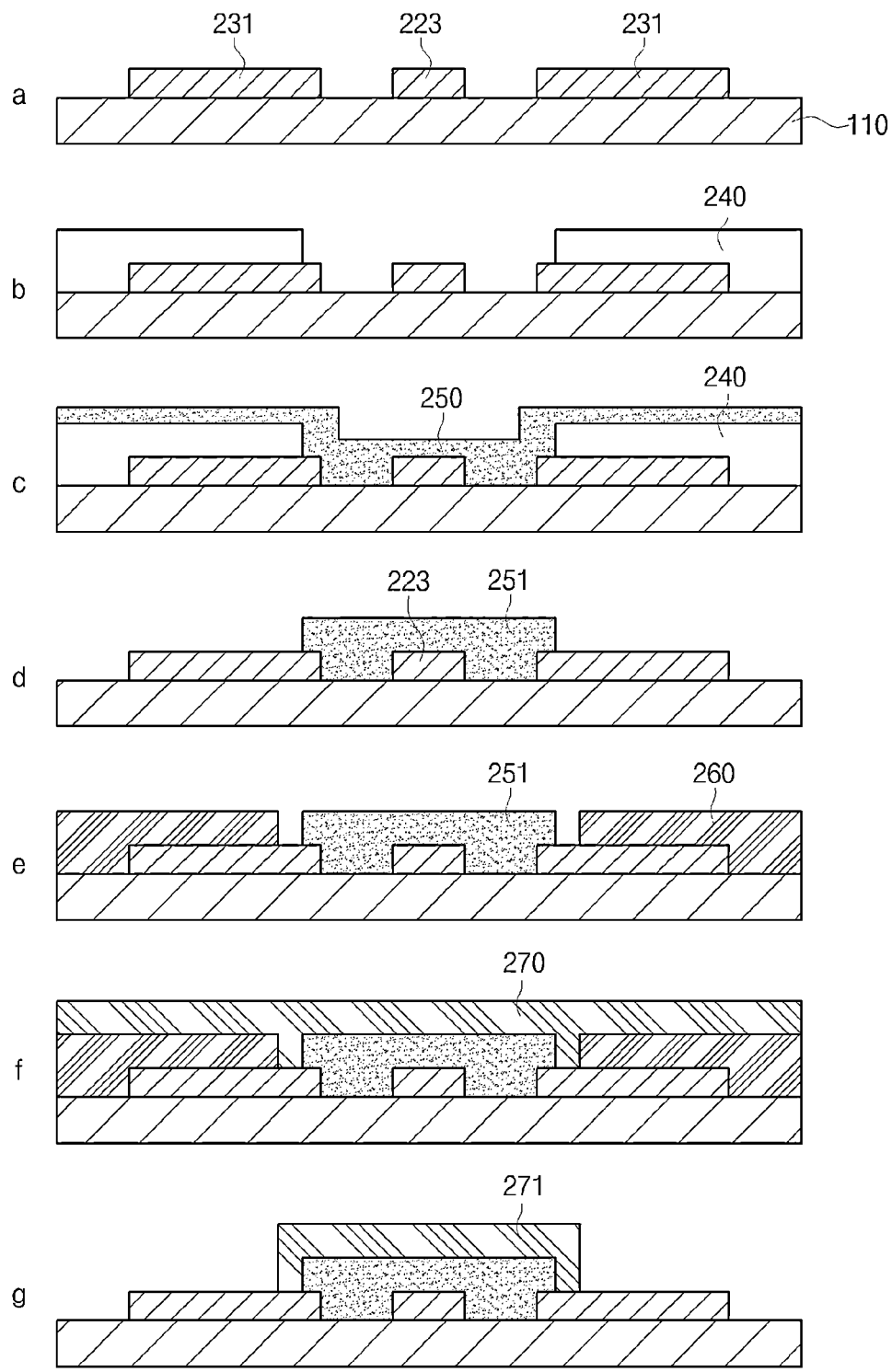
FIGS. 5 and 6 are views illustrating a forming method of an electrode pattern of a touch panel according to a present invention, respectively.
Figure 6:
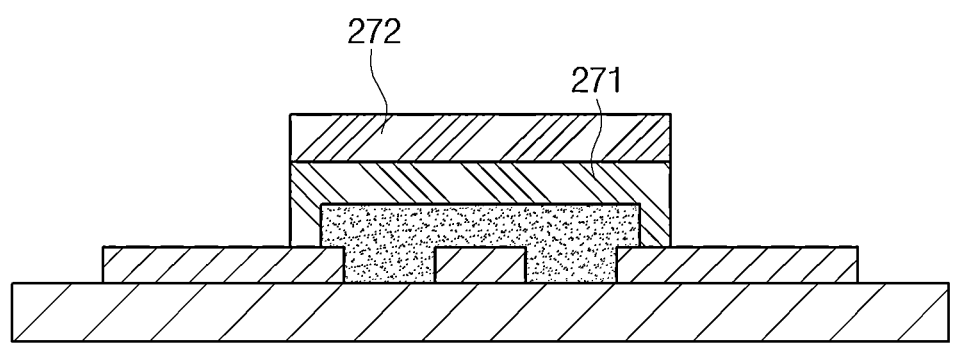

FIGS. 3 and 4 are views illustrating an electrode pattern of a touch panel according to the present invention, respectively, and FIGS. 5 and 6 are views illustrating a forming method of an electrode pattern of a touch panel according to a present invention, respectively.

FIG. 5 is a cross-sectional view of an electrode pattern taken in line A-A' axis in FIG. 3 and FIG. 6 is a cross-sectional view of an electrode pattern taken in line A-A' axis in FIG. 4.

As shown in FIGS. 3 and 5(a), a first electrode pattern 200 connected to a first axial direction Rx is formed on a substrate 200 and a second electrode pattern cells 231 are formed, which is spaced toward a second axial direction Tx.

At this time, the first electrode pattern cells 221 are connected to each other through a conductive lead 223 wherein the first electrode pattern cell 221, the second electrode pattern cell 231 and the conductive lead 223 may be formed with ITO, Carbon Nano Tube (CNT), Ag-Nano wire, conductive polymer or grapheme or the like. Here, the first electrode pattern 220 and the second electrode pattern 230 may be perpendicular; however, they may be arranged on a surface of the substrate at an angle, not including a right angle.

After that, as shown in FIG. 5(b), a photo resist (PR) 240 is formed on the second electrode pattern cell 231, and a dielectric material is applied to form a dielectric material application layer 250, as shown in FIG. 5(c).

In subsequent, a dielectric layer 251 is formed on a first electrode pattern connection part 223 by removing the photo resist layer 240.

After that, as shown in FIG. 5(e), a photo resist 260 is formed on a part except for a portion to connect the second electrode pattern cells 131, and a conductive material is applied thereon to form a conductive material application layer 270, as shown in FIG. 5(f).

After that, as shown in FIG. 5(g), a bridge electrode 271 is formed by removing the photo resist 260.

Generally, LCD appears as a black color when it is off, and as a result the bridge electrode 271 is exposed visibly due to differences of a reflection rate and color between LCD and the bridge conductive.

However, according to the present invention, the bridge electrode 271 is blackened for adjusting color, luminosity or a reflection rate.

That is, according to the present invention, the bridge electrode 271 may be made of Al, Au, Ag, Sn, Cr, Ni, Ti, or Mg to be blacked as metal oxide, nitride or fluoride through a reaction with chemicals. In this blackening, color, luminosity or reflection rate can be adjusted due to the contents of gas and chemicals.

At this time, when the color, luminosity and reflection rate of the bridge electrode 271 are adjusted, they may be adjusted, corresponding to the color, luminosity and reflection rate of the substrate 200, the electrode pattern cells 221, 231 or the dielectric layer 251.

Here, in case where the bridge electrode 271 is formed with metal to be blackened, the color, luminosity and reflection rate can be adjusted by only replacing the metal or gas and thus a separate additional process is not necessary.

As another embodiment of the present invention, as shown in FIGS. 4 and 6, a metal layer 272 may be vapor-deposited or applied over the bridge electrode 271 made of the blackened metal to ensure electric conductivity.

The metal layer 272 is formed to ensure the electric conductivity in case where a predetermined electric conductivity is not kept after blackening the metal. For example, the bridge electrode 271 as a lower layer may be formed as a first black color and the metal layer 272 as an upper layer may be formed as a second black color.

According to another embodiment of the present invention, the bridge electrode 271 may be formed with conductive material of black color group.

For example, the bridge electrode 271 may be formed by using nano synthesis material such as CNT to be blackened. Here, in case where the bridge electrode 271 is formed with the nano synthesis material such as CNT, the color and reflection rate of the bridge conductivity 271 can be adjusted while ensuring the electric conductivity through a control of the contents of nano powder.

Accordingly, the bridge conductivity is not exposed visibly while ensuring the electric conductivity of the bridge conductivity.

Hereinafter, the electrode pattern of a touch panel according to an embodiment of the present invention will be described, referring to FIGS. 3, 5(g), and 6.

The electrode pattern of a touch panel according to an embodiment of the present invention may include a second electrode pattern cell 231 formed in a space to each other, the dielectric layer 251 formed on the second electrode pattern cell 231, and the bridge electrode 271 which is formed by using conductive material of black on the dielectric layer 251 and connects the second electrode pattern cell 231.

As shown in FIG. 3, the first electrode pattern cell 221 is arranged on the substrate in a first axial direction and connected to each other through the conductive lead 223 in the first axial direction, and the second electrode pattern cell 231 is arranged on the substrate 200 in a second axial direction.

The dielectric layer 251 is formed by using a off-set or ink jet process on the conductive lead 223 connecting the first electrode pattern cells 221 to each other and the second electrode pattern cell 231.

The bridge electrode 271 is configured to connect the second electrode pattern cells 231 to each other wherein it may be made of metal oxide, nitride, fluoride as blackened metal material, or CNT. At this time, the metal material may be blackened, corresponding to the luminosity of the substrate 200, the electrode pattern cell, or the dielectric layer 251. In addition, the metal material may be one of Al, Au, Ag, Sn, Cr, Ti, and Mg.

Furthermore, the electrode pattern of a touch panel according to another embodiment of the present invention may be formed by using a plurality of conductive materials as a plurality of layers, as shown in FIG. 6.

That is, as shown in FIG. 6, among the plural layers of the bridge conductive, the lower layer 271 may be formed with the conductive material of a black color and the upper layer 271 may be formed by vapor-depositing or applying metal. Further, among the plural layers of the bridge conductive, the lower layer 271 may be formed with a first blackened conductive material and the upper layer 271 may be formed with a second blackened conductive material.

According to the present invention, the electric conductivity of the bridge electrode is ensured while forming the electrode pattern s Rx, Tx on one film and the bride conductive is not exposed visibly.

Further, according to the present invention, the color, luminosity and darkness and reflection rate of the bridge electrode can be controlled by only the replacement of the metal target and an operation of gas, without separate additional processes.

While the invention has been shown and described with reference to exemplary embodiments thereof, it will be understood by those skilled in the art that various changes in form and details may be made therein without departing from the spirit and scope of the invention as defined by the appended claims. Therefore, the scope of the invention is defined not by the detailed description of the invention but by the appended claims, and all differences within the scope will be construed as being included in the present invention.

What is claimed is:

1. A forming method of an electrode pattern of a touch panel, comprising:
   forming a plurality of electrode pattern cells on a substrate;
   forming a dielectric layer on the electrode pattern cells; and
   forming a bridge electrode connecting the electrode pattern cells on the dielectric layer using a conductive material of a black color;
   wherein the bridge electrode is formed with a metal oxide, metal nitride, or metal fluoride as a blackened metal material;
   wherein the metal material is one of Al, Au, Ag, Sn, Cr, Ni, Ti, and Mg;
   wherein the bridge electrode is formed as a plurality of layers formed by using a plurality of conductive materials;
   wherein among the plurality of layers of the bridge electrode, a lower layer is formed with a conductive material of a first black color and an upper layer is formed with a conductive material of a second black color; and
   wherein a width of the lower layer corresponds to a width of the upper layer.

2. The forming method of an electrode pattern of a touch panel of claim 1, wherein the bridge electrode is blackened, corresponding to the luminosity of the substrate, the electrode pattern cell or the dielectric layer.

3. The forming method of an electrode pattern of a touch panel of claim 1, wherein the bridge electrode is formed with carbon nanotubes.

4. The forming method of an electrode pattern of a touch panel of claim 1, wherein the plurality of the electrode pattern cells are configured by forming first electrode pattern cells on the substrate, which are arranged in a first axial direction wherein the first electrode pattern cells are connected to each other through a conductive lead in the first axial direction, and forming a plurality of second electrode pattern cells arranged in a second axial direction perpendicular to the first axial direction.

5. The forming method of an electrode pattern of a touch panel of claim 4, wherein the dielectric layer is arranged over the conductive lead connection the first electrode pattern cells through an off-set or ink-jet process, and the second electrode pattern cell.

6. An electrode pattern of a touch panel, comprising:
   electrode pattern cells on a substrate;
   a dielectric layer on the electrode pattern cells; and
   a bridge electrode comprising a conductive material of a black color and connecting the electrode pattern cells at the dielectric layer;
   wherein the bridge electrode is formed with a metal oxide, metal nitride, or metal fluoride as a blackened metal material;
   wherein the metal material is one of Al, Au, Ag, Sn, Cr, Ni, Ti, and Mg;
   wherein the bridge electrode is formed as a plurality of layers by using a plurality of conductive materials;
   wherein among the plurality of layers of the bridge electrode, a lower layer is formed with a conductive material of a first black color and an upper layer is formed with a conductive material of a second black color; and
   wherein a width of the lower layer corresponds to a width of the upper layer.

7. The electrode pattern of a touch panel of claim 6, wherein the bridge electrode is blackened, corresponding to the luminosity of the substrate, the electrode pattern cell or the dielectric layer.

8. The electrode pattern of a touch panel of claim 6, wherein the bridge electrode is formed with Carbon Nano Tube.

9. The electrode pattern of a touch panel of claim 6, wherein the electrode pattern cells comprise a plurality of first electrode pattern cells on the substrate that are arranged in a first axial direction, wherein the first electrode pattern cells are connected to each other through a conductive lead in the first axial direction; and a plurality of second electrode pattern cells arranged in a second axial direction perpendicular to the first axial direction.

10. The electrode pattern of a touch panel of claim 9, wherein the first conductive electrode pattern cells and the second electrode pattern cells are insulated by the dielectric layer.

* * * * *